United States Patent [19]

Martin

[11] 4,052,311
[45] Oct. 4, 1977

[54] APPARATUS FOR SEPARATING SOLIDS FROM LIQUIDS

[75] Inventor: William F. Martin, Tulsa, Okla.

[73] Assignee: James A. Herring, Tulsa, Okla. ; a part interest

[21] Appl. No.: 650,039

[22] Filed: Jan. 19, 1976

[51] Int. Cl.² .................... B01D 35/06; B01D 21/24
[52] U.S. Cl. ................................ 210/223; 198/563; 210/298; 210/523
[58] Field of Search ............. 210/222, 223, 298, 532, 210/523; 209/232; 198/64

[56] References Cited

U.S. PATENT DOCUMENTS

| 143,774 | 10/1973 | Moore | 210/532 X |
|---|---|---|---|
| 948,924 | 2/1910 | Goedecker | 210/532 X |
| 1,355,070 | 10/1920 | Allen | 210/532 |
| 2,714,959 | 8/1955 | Mielke | 209/232 |
| 3,100,052 | 8/1963 | Brombeck | 198/64 X |
| 3,197,075 | 7/1965 | Hanson | 198/64X |
| 3,402,820 | 9/1968 | Lohmann | 210/222 |
| 3,472,383 | 10/1969 | Daniels et al. | 210/298 X |
| 3,487,939 | 1/1970 | Keeley | 210/222 |
| 3,522,873 | 8/1970 | Wallace | 198/64 X |

Primary Examiner—Theodore A. Granger
Attorney, Agent, or Firm—Head, Johnson & Chafin

[57] ABSTRACT

An apparatus for separating solids, such as metal cuttings, from liquids, such as machine coolant, the apparatus having an upwardly inclined elongated housing which in cross-section is U-shaped with a semi-circular bottom and parallel sides, the housing being opened at the top and covered throughout its length by a removable lid, a helix rotated in the housing and extending from the lower end to the upper end, the housing having a solids discharge chute near the upper end, a gear motor mounted on the upper end of the housing for rotation of the helix and having at the lower end an upwardly extending fluid inlet chamber, the open top serving as an inlet by which solids containing liquids is conducted into the apparatus and having an upwardly extending overflow chamber connected with the lower portion of the housing, the walls of the overflow chamber being of less height than the inlet chamber, the inlet chamber, the overflow chamber and the lower portion of the housing together forming a quiescent zone in which solid particles can settle into the lower portion of the housing where they are picked up by the rotating helix and carried upwardly to the discharge chute, the liquid flowing out of the overflow chamber being collected for recirculation. To augment the separation of paramagnetic particles, permanent magnets may be secured to the bottom of the lower portion of the housing.

10 Claims, 5 Drawing Figures

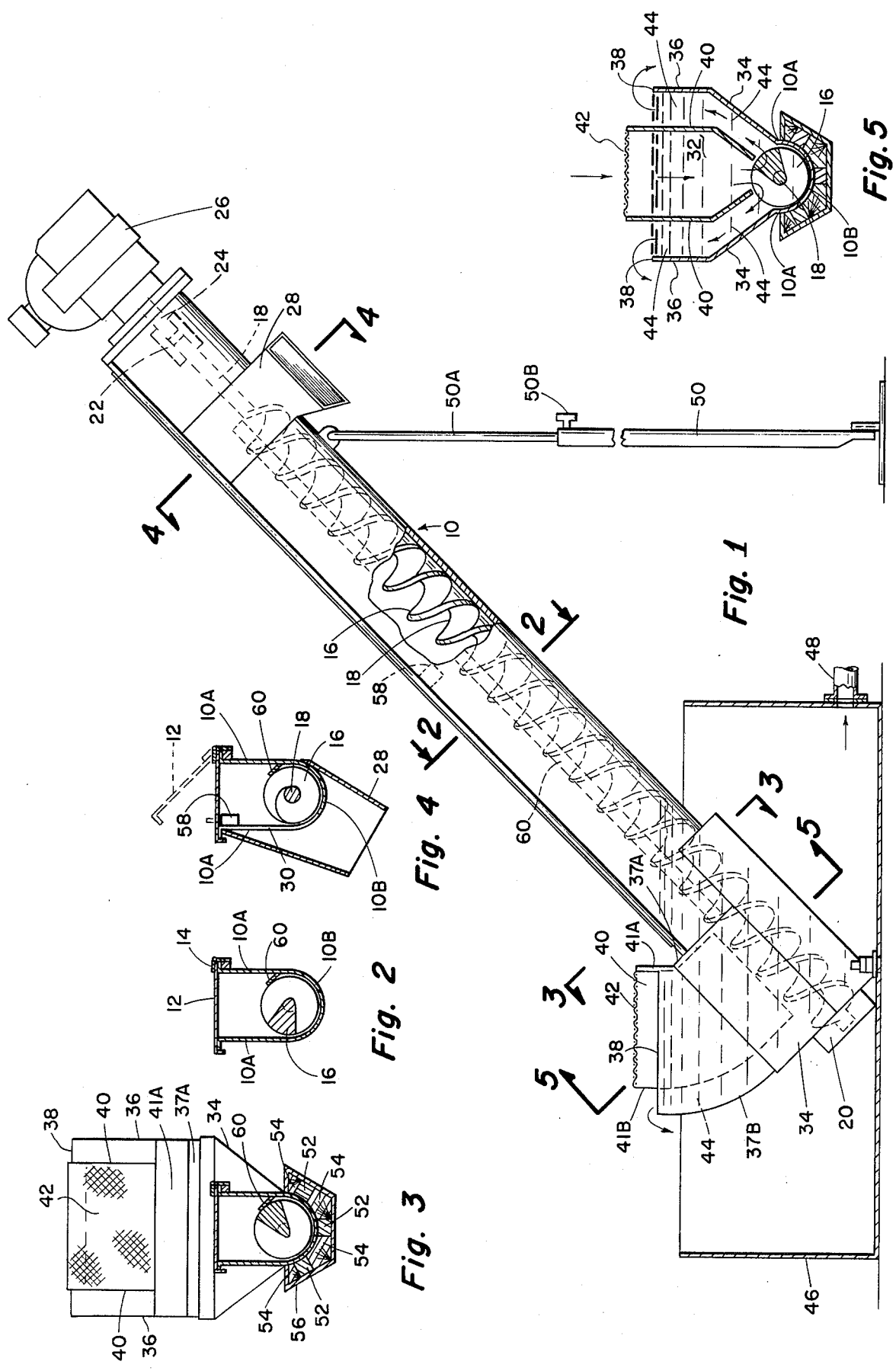

APPARATUS FOR SEPARATING SOLIDS FROM LIQUIDS

BACKGROUND AND OBJECTS OF THE INVENTION

There are many industrial needs for an apparatus to separate solid particles from liquid. The apparatus as described in this disclosure is intended to meet these needs but it is particularly adaptable for use in separating metal chips and shavings from coolant liquid.

A unique and effective apparatus for accomplishing these results is exemplified in U.S. Pat. No. 3,402,820 issued to E. P. Lohmann Sept. 24, 1968 and entitled "MAGNETIC CLEANER FOR COOLANT." The apparatus disclosed in this patent has a tube with a helix rotated in it. At the lower end of the tube are magnets. The tube has an inlet opening above the magnets and a liquid outlet opening below them. Liquid is introduced and flows downwardly past the magnets and out the lower end. Paramagnetic particles are attracted by the magnets and picked up by the rotating helix which moves them upwardly to a discharge opening in the upper end of the tube. The device of this patent works successfully except for three basic problems which in some instances interfere with the fullest commercial utilization of the concept. The first problem with the device illustrated in U.S. Pat. No. 3,402,820 is that it is usable only when the solid particles are of a paramagnetic nature, that is, are attracted by the permanent magnets affixed to the lower end. The device is not usable for machine coolant in which aluminum, brass, or other heavy nonparamagnetic metals are entrained. Second, the device does not provide a settling zone wherein solid components have an opportunity to settle out of the liquid so as to be picked up by the helix. Third, large metal objects, including large cuttings, or even bolts or nuts which may be occasionally dropped into the coolant circulation system, can be trapped between the helix and the tube and there is no readily available way for removing them.

The present apparatus is directed toward an improvement means of separating solid contaminants from liquid and specifically cuttings from machine tool coolant, which overcomes the problems and limitations of U.S. Pat. No. 3,402,820 and other similar type devices.

It is therefore an object of this invention to provide an apparatus for separating solids from liquids. More particularly, an object of this invention is to provide an apparatus for separating metal cuttings from machine coolant.

Still more particularly, an object of this invention is to provide an apparatus for separating cuttings from machine coolant including an upwardly inclined housing having a rotating helix therein, means at the lower end of the housing providing a quiescent settling zone from which solid particles may be separated and passed into the lower portion of the housing to be picked up by the helix for discharge out the upper end of the housing so as to provide a means of separating all types of solids, whether paramagnetic or not.

Another particular object of this invention is to provide an improved apparatus for separating cuttings from machine coolant arranged so that solid objects cannot become lodged or jammed within the machine.

These general objects, as well as other and more specific objects of the invention will be fulfilled in the following description and claims, taken in conjunction with the attached drawings.

DESCRIPTION OF VIEWS

FIG. 1 is a side elevational view of the apparatus of this invention for separating solids from liquids, shown partially cut away.

FIG. 2 is a cross-sectional view taken along the lines 2—2 of FIG. 1 and showing the elongated housing and helix which are the basic component of the apparatus.

FIG. 3 is a cross-sectional view taken along the line 3—3 of FIG. 1 showing the lower portion of the apparatus.

FIG. 4 is a cross-sectional view taken along the lines 4—4 of FIG. 1 and showing the discharge chute at the upper end of the housing where solid particles are discharged for collection.

FIG. 5 is a cross-sectional view taken along the lines 5—5 of FIG. 1 showing the inlet chamber, the outlet chamber, the lower portion of the housing in the arrangement which provides a quiescent zone for settling the solid particles out into the lower portion of the housing to be picked up by the rotating helix.

SUMMARY OF THE INVENTION

An apparatus for separating solids from a liquid, including an elongated upwardly inclined housing having, in the preferred cross-sectional arrangement, a U-shaped configuration with a semi-circular bottom, a helix rotatably supported in the housing extending the full length of the housing, the exterior circumference of the helix closely conforming to the semi-circular bottom of the housing, an inlet chamber communicating with the housing lower portion, an outlet chamber providing an overflow weir of a height less than the height of the inlet chamber, the inlet chamber, overflow outlet chamber and lower portion of the housing together providing a quiescent settling zone in which solid bearing liquid placed therein is maintained in a low turbulent pool permitting solid particles to settle out and into the lower portion of the housing where the solids are picked up by the rotating helix and carried upwardly for discharge through a discharge chute at the upper end of the housing, a gear motor supported at the upper end of the housing for rotating the helix and an overflow vessel in which the lower end of the housing is positioned to capture liquid flowing over the overflow weir, the housing having a door closing the upper portion thereof so that, with the door open, substantially the full length of the helix is disclosed for removal of any solid object which might be trapped between the helix and the housing.

DETAILED DESCRIPTION OF THE PREFERRED EMBODIMENT

Referring now to the drawings and first to FIG. 1, a preferred embodiment of the invention is illustrated. An elongated upwardly inclined housing 10 has, as shown in FIG. 2, a U-shaped cross-sectional configuration with parallel sides 10A and a semi-circular bottom 10B. The upper end of the housing is open and is covered by a lid 12 attached to one of the housing walls 10A by a hinge 14.

Rotatably positioned within the housing 10 is a helix 16 which preferably includes an integral shaft 18. The lower end of the shaft is rotatably received in a bearing block 20 and the upper end of the shaft is attached by means of a coupling 22 to the output shaft 24 of a gear motor 26, the gear motor being supported to the upper end of the housing 10.

Adjacent the upper end of housing 10 shown best in FIGS. 1 and 4, is a discharge chute 28. An opening 30 is formed partially in housing bottom 10B and partially in a side wall 10A and permits large, oddly shaped solids which have been moved above the helix and are being carried upwardly by the helix 16 to pass out and downwardly for collection.

Formed at the lower end of housing 10, as best illustrated in FIGS. 1, 3 and 5, is a quiescent settling zone 32. Zone 32 is formed by the lower portion of the housing 10 including the bottom 10B and inclined outlet chamber side walls 34 which taper upwardly to parallel outlet chamber side walls 36 and end walls 37A. The upper termination of the outlet side walls 36 and end wall 37B provides an overflow weir 38.

Positioned within the outlet chamber is an inlet chamber formed by parallel side walls 40 and end walls 41A and 41B. The inlet chamber is opened at the top and covered by a protective screen 42. Liquid having solids entrained therein is conducted into the apparatus through the screen 42 where it passes downwardly into a quiescent settling zone 32.

Between the lower end of the inlet side walls 40 and end wall 41B and the outlet chamber side walls 36 and end wall 37B are passageways 44 whereby liquid may flow up and out over the overflow weir 38, the solids passing downwardly and around helix 16.

As shown in FIG. 1 the lower portion of the housing 10 including the members which form the quiescent settling zone 32 are positioned inside a collecting vessel 46 having an outlet 48. Fluid passing out of the apparatus flows over the overflow weir 38 and is collected in vessel 46 for recirculation.

The housing 10 is supported adjacent its upper end by an adjustable height leg 50 which may be tripod in shape. The height of the leg 50 may be adjusted so as to vary the angle of inclination of the housing 10. While the housing may be positioned in a preselected elevational angle applicable for most uses, varying viscosities of liquids to be handled compared with the relative density and size of the solids to be separated may require that the angle of the housing relative to the horizontal be varied. This can be accomplished when the leg 50 is telescopic, including an upward portion 50A slidably received in the lower portion 50 and including a set screw 50B. When a change is made in the angle of inclination of housing 10 it is necessary to change the dimensions of plenum side walls 36 so that the overflow weir 38 remains horizontal. Obviously, many other means may be provided for supporting the housing upper end and for varying the angle of the housing.

Positioned around the housing bottom 10B of the lower portion as an alternate arrangement is a series of permanent magnets 52 (see FIGS. 3 and 5). The magnets are separated by nonmagnetic materials, such as wood blocks 54. The assembly of the magnets 52 and blocks 54 are encompassed in a protective closure 56. Magnets 52 may be advantageously utilized when the apparatus is particularly applied for separating paramagnetic cuttings from machine tool coolants.

OPERATION

Liquid, such as machine coolant having cuttings, therein, is conducted into the apparatus passing downwardly through the screen 42 into the inlet chamber formed by the side walls 36 and end walls 41A and 41B.

The liquid passes into quiescent settling zone 32. In the relatively large quiescent zone the heavy solid components are permitted to settle out. The fluid flows upwardly through passageway 34 and ultimately out over the overflow weir 38 and into collecting vessel 46 where it may be recirculated.

The solid particles in the liquid settle downwardly into the lower portion of the housing 10 into the area around helix 16. The helix is constantly rotated while liquid is flowing into the inlet so that as solid particles accumulate they are carried upwardly in the housing. Liquid is free to drain from and flow downwardly in the housing back into the settling zone. The length of the housing and the rate of rotation and the pitch of the helix governs the time permitting the solid particles to be drained of liquid. The solid particles reach the discharge chute 28 relatively free of liquid and are passed outwardly for collection and reuse as salvage material.

The apparatus fulfills all of the objectives initially set forth. It provides a continually operating device for constantly separating solids from liquid and for discharging the solids in one area for reuse and the liquid into a collection vessel for recirculation. The device is substantially maintenance and trouble free. Any particles that become entrapped between the helix and the housing can easily be removed by opening lid 12. When the lid 12 is opened an interlock switch 58 is actuated stopping the gear motor 26 so as to prevent an operator from getting his hand caught by the helix.

Positioned along the interior of the housing and attached to one of the side walls 10A is an elongated scraping bar 60, which serves to scrape off solid particles which tend to cling to the periphery of the helix 16 to make sure that they are moved upwardly by the helix rather than simply rotated as the helix is turned.

The machine is designed so as to be least likely to be jammed by large or oddly shaped objects. Housing 10 has a large area above the helix 16 so that large objects can ride on the helix to the upper end. When discharge chute 28 is reached a large object can fall downwardly around the auger through opening 30, without passing through the auger.

While the invention has been described with a certain degree of particularly it is manifest that many changes may be made in the detailed construction in the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed:

1. An apparatus for separating solids from liquids, such as metal cuttings from machine coolant, comprising:
    an upwardly inclined elongated housing having a solids discharge chute adjacent the upper end and an inlet opening adjacent the bottom;
    a helix rotatably positioned in said housing extending from the housing inlet and upwardly at least to said solids discharge chute;
    an upwardly extending liquid outlet chamber having an inwardly inclined open bottom connecting with said housing inlet opening adjacent and above said helix, the open top of the outlet chamber forming an overflow weir;

an upwardly extending inlet chamber having an inwardly inclined open bottom adjacent and above said helix, the inlet chamber being supported within said outlet chamber and providing fluid passageways between the inlet chamber bottom and the interior of the outlet chamber, whereby fluid received in said inlet chamber flows out the inlet chamber bottom and at least partially into the lower portion of said housing and upwardly through said fluid passageways to the upper portion of said outlet chamber, the upper end of the outlet chamber being lower than the upper end of the inlet chamber whereby liquid passes out by flowing over the outlet chamber upper overflow weir, solids passing downwardly from said inlet chamber into said housing inlet opening, the inlet chamber and outlet chambers forming a quiescent fluid reservoir from which solids are permitted to settle into said housing and the lower portion of said helix; and means of rotating said helix to move separated solids upwardly in said housing for discharge out said discharge chute.

2. An apparatus according to claim 1 on which said housing is of U-shaped cross-sectional configuration having a semi-circular bottom portion closely receiving the external diameter of said helix.

3. An apparatus according to claim 2 wherein said housing has an open top and including:

a lid removably closing said housing, the lid when open exposing said helix for substantially the full length thereof.

4. An apparatus according to claim 3 including:

an electrical interlock switch actuated by said door when closed, said switch serving to de-energize said means of rotating said helix when said door is open.

5. An apparatus according to claim 1 including:

at least one magnet positioned adjacent said housing lower portion, said magnet serving to attract paramagnetic particles to the lower portion of said housing.

6. An apparatus according to claim 2 including:

an elongated scraping bar affixed to one wall of said housing and extending parallel the rotational axis of said helix and having one surface adjacent to the periphery of said helix.

7. An apparatus according to claim 1 wherein said means to rotate said helix includes:

a gear motor supported at the upper end of said housing, the gear motor having an output shaft coaxial with and coupled to said helix.

8. An apparatus according to claim 1 including:

an open top overflow vessel in which the lower portion of said housing is positioned, fluid passing out of said housing overflow weir flowing into said vessel for reuse.

9. An apparatus according to claim 1 wherein said housing solids discharge comprises:

a discharge chute affixed to said housing and downwardly depending therefrom, the discharge chute communicating with a bottom discharge opening in said housing adjacent the upper end thereof.

10. An apparatus according to claim 1 including means of selectively changing the angle of said housing relative to the horizontal.

* * * * *